US010957934B2

(12) United States Patent
Hisano (10) Patent No.: US 10,957,934 B2
(45) Date of Patent: Mar. 23, 2021

(54) TRANSFER APPARATUS USING ELECTROSTATIC ATTRACTION AND TRANSFER METHOD USING ELECTROSTATIC ATTRACTION (71) Applicant: TOYOTA JIDOSHA KABUSHIKI KAISHA, Toyota (JP)

(72) Inventor: Hirohiko Hisano, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 289 days.

(21) Appl. No.: 16/257,274

(22) Filed: Jan. 25, 2019

(65) Prior Publication Data
US 2019/0245235 A1 Aug. 8, 2019

(30) Foreign Application Priority Data

Feb. 8, 2018 (JP) .............................. JP2018-021238

(51) Int. Cl.
*H01M 2/10* (2006.01)
*H01M 8/2404* (2016.01)
*B23B 31/28* (2006.01)
*H01M 8/1004* (2016.01)

(52) U.S. Cl.
CPC ........... *H01M 8/2404* (2016.02); *B23B 31/28* (2013.01); *H01M 2/1005* (2013.01); *H01M 8/1004* (2013.01)

(58) Field of Classification Search
CPC .......... B23B 31/24; B23B 31/28; H01M 2/10; H01M 2/1005; H01M 2/1011; H01M 8/1004; H01M 8/2404; H01M 2008/1095; Y02E 60/10; Y02E 60/50; H01L 21/683; H01L 21/6831; H01L 21/6833
See application file for complete search history.

(56) References Cited

U.S. PATENT DOCUMENTS 7,755,877 B2 * 7/2010 Kamono ............... G03F 7/7075
361/234
2005/0286202 A1 * 12/2005 Nakamura ............. H02N 13/00
361/234
(Continued)

FOREIGN PATENT DOCUMENTS

CN 104838484 A 8/2015
CN 107393856 A 11/2017
(Continued)

OTHER PUBLICATIONS

P. Ramm et al., Handbook of Wafer Bonding, National Defense Industry Press, Beijing, Jun. 2012 (with English translation).

*Primary Examiner* — Matthew V Nguyen
(74) *Attorney, Agent, or Firm* — Dickinson Wright PLLC (57) ABSTRACT

A transfer apparatus using an electrostatic attraction includes an electrostatic chuck for attracting and placing a workpiece as a transfer member on a placement surface by electrostatic attraction. The electrostatic chuck is grounded by an earth via a ground electrode after the electrostatic chuck receives electric power from a power supply surface of a power source via power receiving electrodes of the electrostatic chuck, so that the electrostatic chuck is configured to attract and place the workpiece on the placement surface by electrostatic attraction in a state where electrostatic balance is broken.

8 Claims, 8 Drawing Sheets

(56) References Cited

U.S. PATENT DOCUMENTS

| | | | |
|---|---|---|---|
| 2013/0048217 A1* | 2/2013 | Shiraiwa | H01J 37/32733 |
| | | | 156/345.53 |
| 2015/0295521 A1 | 10/2015 | Tatsumi et al. | |
| 2015/0348814 A1* | 12/2015 | Shiraiwa | H01L 21/6833 |
| | | | 156/345.51 |

FOREIGN PATENT DOCUMENTS

| | | | | |
|---|---|---|---|---|
| JP | 2002-345273 A | 11/2002 | | |
| JP | 2006040993 A | 2/2006 | | |
| JP | 2013-149935 A | 8/2013 | | |
| JP | 2013-251353 A | 12/2013 | | |
| WO | WO-2012014428 A1 * | 2/2012 | ....... | H01L 21/67742 |

\* cited by examiner

TRANSFER APPARATUS USING ELECTROSTATIC ATTRACTION AND TRANSFER METHOD USING ELECTROSTATIC ATTRACTION

INCORPORATION BY REFERENCE

The disclosure of Japanese Patent Application No. 2018-021238 filed on Feb. 8, 2018 including the specification, drawings and abstract is incorporated herein by reference in its entirety.

BACKGROUND

1. Technical Field

The disclosure relates to a transfer apparatus using an electrostatic attraction and a transfer method using an electrostatic attraction and relates, for example, to a transfer apparatus and a transfer method that transfer a component, forming a fuel cell, at high speed by electrostatic attraction using an electrostatic chuck carrying no power source.

2. Description of Related Art

A fuel cell (hereinafter may also be referred to as a "fuel cell stack") is formed by stacking a plurality of cells (hereinafter may also be referred to as "unit batteries" or "fuel battery cells"), each including an anode, a cathode, and an electrolyte membrane sandwiched between the anode and the cathode, one upon another with separators each interposed between the adjacent cells.

For example, fuel battery cells of a solid polymer electrolyte fuel cell each include a membrane electrode assembly (MEA) composed of an electrolyte membrane having ionic conductivity, and an anode-side catalyst layer (electrode catalyst layer) and a cathode-side catalyst layer (electrode catalyst layer) sandwiching the electrolyte membrane therebetween. Gas diffusion layers (GDLs) for providing a fuel gas and an oxidant gas and collecting electricity generated by an electrochemical reaction are formed on both sides of the MEA. The MEA with the GDLs disposed on both sides thereof is called a membrane electrode & gas diffusion layer assembly (MEGA). The MEGA is sandwiched between a pair of separators. Herein, the MEGA serves as a power generation portion of the fuel cell, while, when there is no gas diffusion layer, the MEA serves as a power generation portion of the fuel cell.

As this type of fuel battery cell, there is known a resin-framed MEGA (hereinafter may also be referred to as a "frame MEGA") configured such that a resin frame (resin sheet) formed in a sheet-like frame shape and made of a synthetic resin such as polypropylene (PP), phenolic resin, epoxy resin, polyethylene (PE), or polyethylene terephthalate (PET) is disposed at a peripheral portion of a membrane electrode assembly for the purpose of protecting the membrane electrode assembly, reducing the manufacturing cost, and so on. In this frame MEGA, the membrane electrode assembly and the resin frame are bonded together using an adhesive.

The resin-framed fuel battery cell described above is manufactured through, for example, a process of applying the adhesive to the membrane electrode assembly, a process of placing the resin frame on the adhesive, a process of curing the adhesive by irradiation of ultraviolet rays, a process of pressing the membrane electrode assembly, and so on.

The fuel cell (fuel battery cell) that requires the processes as described above is manufactured by providing the respective processes along a linear conveyor and conveying a palette, on which a workpiece (component forming the fuel cell) is placed, intermittently in a forward direction on the linear conveyor so as to perform predetermined treatments in the respective processes in sequence.

In the meantime, it has been discussed to employ transfer using an electrostatic chuck instead of transfer using a conventional vacuum chuck in a manufacturing method of this type of fuel cell (fuel battery cell) in order to transfer a workpiece (component of the fuel cell) at high speed to shorten the manufacturing time.

The transfer is a method of generating gradient force (electrostatic force) by finely patterning an electrode to increase attraction force using the gradient force, thereby attracting (electrostatically attracting) an insulating material (workpiece) on an electrostatic chuck to transfer the insulating material (see, e.g. Japanese Unexamined Patent Application Publication No. 2002-345273 (JP 2002-345273 A), Japanese Unexamined Patent Application Publication No. 2013-149935 (JP 2013-149935 A), Japanese Unexamined Patent Application Publication No. 2013-251353 (JP 2013-251353 A)).

SUMMARY

However, for example, according to the conventional technique described in JP 2002-345273 A or the like, since the electrostatic chuck is connected via electrical wires to a power source, that applies attraction voltage (direct-current voltage), so as to generate gradient force via the electrical wires, the movable range is limited. It may be considered to use a rechargeable battery as a power source and simultaneously transfer the power source, but there arise problems such that since a housing, the rechargeable battery, a power circuit, and so on are simultaneously transferred, the transfer weight increases to impede high-speed transfer, and that it takes time to charge the rechargeable battery.

The disclosure provides a transfer apparatus using an electrostatic attraction and a transfer method using an electrostatic attraction, that can expand the movable range during transfer without increasing the transfer weight.

According to a first aspect of the disclosure, a transfer apparatus using an electrostatic attraction includes: an electrostatic chuck including an electrostatic electrode disposed at a placement surface and including a power receiving electrode and a ground electrode disposed at a surface different from the placement surface, the electrostatic chuck configured to attract and place a transfer member on the placement surface by electrostatic attraction; a conveyor configured to move the electrostatic chuck; a power source having a power supply surface configured to apply a voltage to the electrostatic electrode by coming in contact with the power receiving electrode when the electrostatic chuck moves on the conveyor; an earth configured to ground the electrostatic chuck by coming in contact with the ground electrode when the electrostatic chuck moves on the conveyor; and a putting apparatus configured to put the transfer member on the placement surface, wherein: a power supply start position where the power supply surface starts to come in contact with the power receiving electrode is provided upstream of a putting position where the transfer member is put on the placement surface by the putting apparatus; a grounding start position where the earth starts to come in contact with the ground electrode is provided downstream of the power supply start position; a grounding end position where the earth ends to come in contact with the ground electrode is provided upstream of a power supply end position where the power supply surface ends to come in contact with the power receiving electrode; and the electrostatic chuck is grounded by the earth via the ground electrode after the electrostatic chuck receives electric power from the power supply surface via the power receiving electrode, the electrostatic chuck configured to attract and place the transfer member on the placement surface by the electrostatic attraction in a state where electrostatic balance is broken.

The putting position may be provided between the grounding start position and the grounding end position.

The electrode chuck may include an aluminum plate. The power receiving electrode may pass through the aluminum plate and may be electrically connected to the electrostatic electrode, and the ground electrode may be electrically connected to the aluminum plate.

The power supply surface and the earth may be disposed across the conveyor from each other.

The conveyor may be provided in an endless annular shape, the electrostatic chuck may be configured to circulate on the conveyor, and a polarity-reversing power supply surface for reversing polarity of voltage applied to the electrostatic chuck moving on the conveyor may be provided.

The polarity-reversing power supply surface may be provided separately from the power supply surface, and the polarity-reversing power supply surface and the power supply surface may both be configured to use voltage of the power source.

The power source may be formed by a pulse power source, and the polarity-reversing power supply surface may be formed on the power supply surface by the pulse power source.

According to a second aspect of the disclosure, a transfer method using an electrostatic attraction includes: causing an electrostatic chuck to receive electric power from a power supply surface by bringing a power receiving electrode into contact with the power supply surface when the electrostatic chuck moves on a conveyor configured to move the electrostatic chuck, the electrostatic chuck including an electrostatic electrode disposed at a placement surface and including the power receiving electrode and a ground electrode disposed at a surface different from the placement surface, the electrostatic chuck configured to place a transfer member on the placement surface by electrostatic attraction, the power supply surface included in a power source and configured to apply a voltage to the electrostatic electrode; grounding the electrostatic chuck by bringing the ground electrode into contact with an earth after the electrostatic chuck receives the electric power, the earth configured to ground the electrostatic chuck; putting the transfer member on the placement surface by a putting apparatus configured to put the transfer member on the placement surface, and attracting the transfer member on the placement surface by the electrostatic attraction in a state where electrostatic balance in the electrostatic chuck is broken; and transferring the transfer member attracted on the placement surface.

According to the disclosure, the electrostatic chuck is grounded by the earth via the ground electrode after the electrostatic chuck receives the electric power from the power supply surface via the power receiving electrode, so that the electrostatic chuck attracts and places the transfer member on the placement surface by the electrostatic attraction in the state where the electrostatic balance is broken. Therefore, it is possible to expand the movable range during transfer without increasing the transfer weight.

Since the polarity-reversing power supply surface for reversing the polarity of voltage applied to the electrostatic chuck moving on the conveyor is provided, it is possible to prevent a decrease in attraction force that would be otherwise caused by continuing application of the same polarity voltage.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, the configuration of the disclosure will be described in detail based on one example of an embodiment shown in the drawings. While a description will be given by way of example of a case where the disclosure is applied to a fuel cell or a fuel cell system including the fuel cell that is installed in a fuel cell vehicle, the application range is not limited thereto. While a description will be given by way of example of a case where a fuel battery cell forming a fuel cell is transferred as a transfer member, the application range is not limited thereto.

Configuration of Fuel Battery Cell

First, the configuration of a fuel battery cell 1 as a transfer object of an transfer apparatus 200 according to this embodiment will be briefly described with reference to FIGS. 1A and 1B.

Figure 1A:
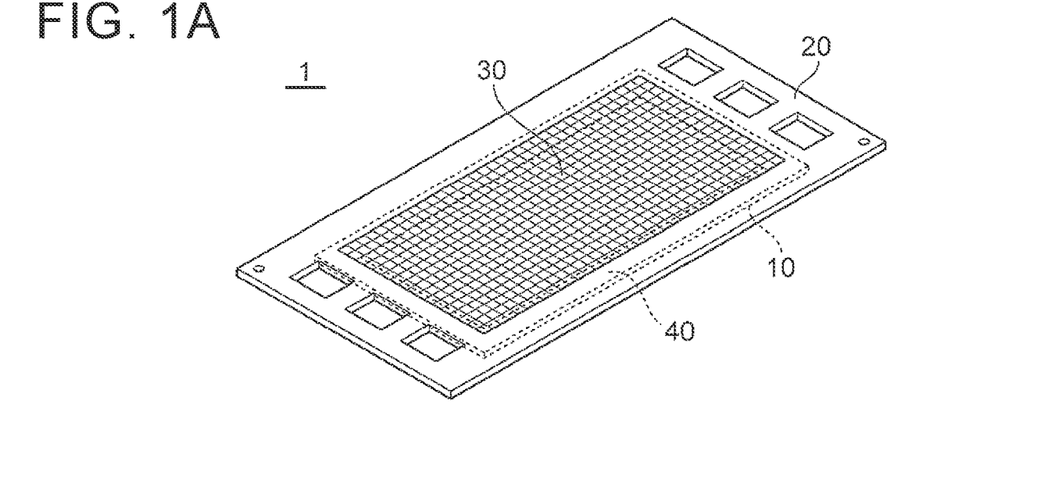
FIG. 1A is a perspective view showing one example of a fuel battery cell as a transfer member according to an embodiment of the disclosure.
Figure 1B:
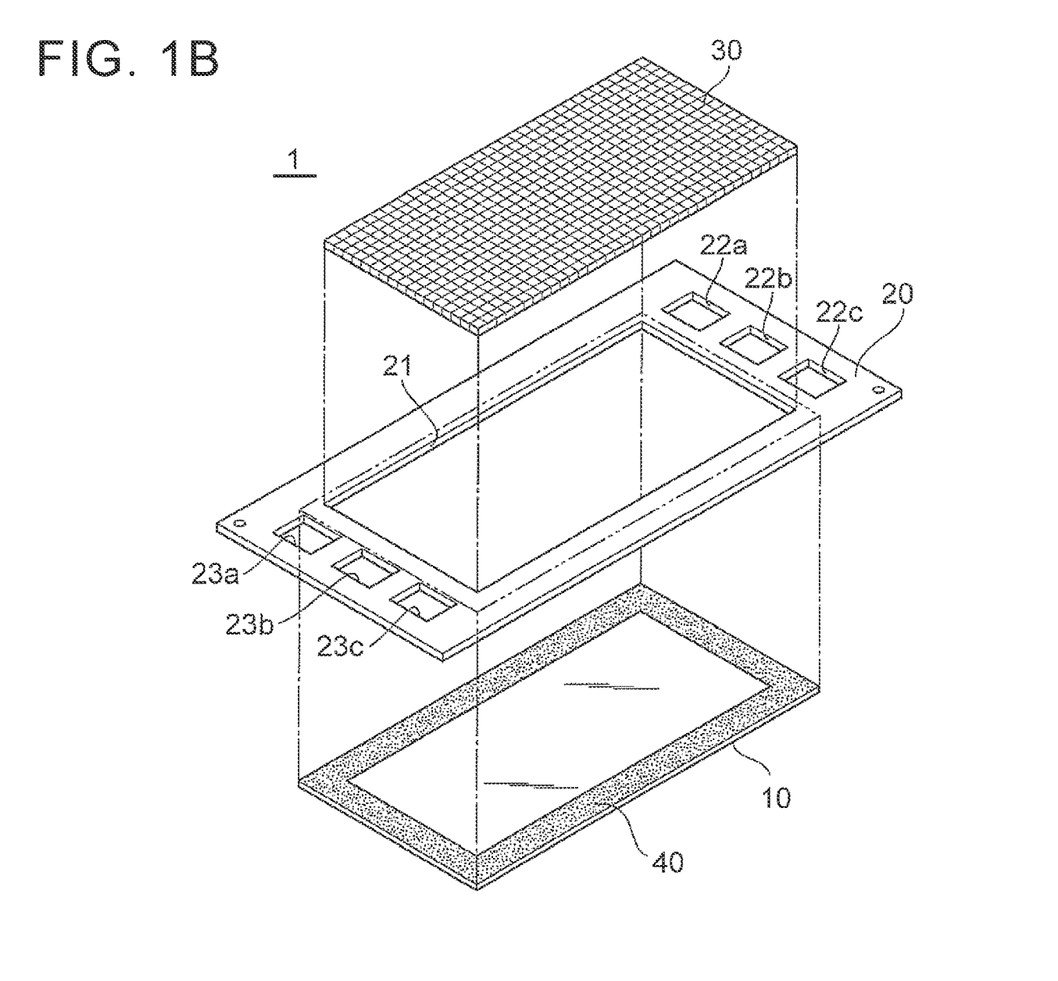
FIG. 1B is an exploded perspective view showing the fuel battery cell as the transfer member according to the embodiment of the disclosure.

The fuel battery cell 1 according to this embodiment is an electrode member of a fuel cell, and as shown in FIGS. 1A and 1B, includes an AnMEGA 10, a resin sheet 20, a CaGDL 30 (cathode-side GDL), and an adhesive 40.

The AnMEGA 10 includes a MEA (membrane electrode assembly) and an AnGDL (anode-side GDL). The MEA is composed of an electrolyte membrane, and an anode-side electrode catalyst layer and a cathode-side electrode catalyst layer sandwiching the electrolyte membrane therebetween. The electrolyte membrane is formed by an ion-exchange membrane using a polymer membrane having ionic conductivity as an electrolyte. The AnGDL is disposed on the outer side of the anode-side electrode catalyst layer of the MEA to form an anode-side gas diffusion layer and has a function to facilitate the gas flow and enhance the current collection efficiency. That is, the AnMEGA 10 is an electrode body formed by an assembly of the MEA and the AnGDL.

The resin sheet 20 is made of a synthetic resin such as polypropylene (PP) and formed in a sheet-like rectangular shape by a processing method such as injection molding or extrusion molding. A rectangular through-hole 21 a little smaller than the outer dimensions of the AnMEGA 10 is formed at a central portion of the resin sheet 20, and the CaGDL 30 is fitted into the through-hole 21 (with a slight gap therearound). The resin sheet 20 is formed at both end portions in its longitudinal direction with through-holes 22a, 22b, 22c and through-holes 23a, 23b, 23c as passage holes for respectively supplying and discharging fluids, i.e. a fuel gas (e.g. hydrogen), an oxidant gas (e.g. air), and a coolant.

The CaGDL 30 is disposed on the outer side of the cathode-side electrode catalyst layer of the AnMEGA 10 to form a cathode-side gas diffusion layer. The CaGDL 30 is formed in a rectangular sheet shape and made of a material having gas permeability and electrical conductivity, for example, a porous fiber base material such as carbon fiber or graphite fiber. The CaGDL 30 is fitted into the through-hole 21 of the resin sheet 20 (with a slight gap therearound) and bonded to the AnMEGA 10.

The adhesive 40 is applied so as to provide bonding between the AnMEGA 10 and the resin sheet 20 and bonding between the AnMEGA 10 and the CaGDL 30. Specifically, the adhesive 40 is applied in a predetermined width along an outer frame portion of an upper surface of the AnMEGA 10 in such a way as to provide an outer region where the AnMEGA 10 and the resin sheet 20 overlap each other, and an inner region, protruding into the through-hole 21, where the AnMEGA 10 and the CaGDL 30 overlap each other. For example, the adhesive 40 is of the ultraviolet ray (UV) curing type and can be cured by irradiating UV to a bonding portion and also by heating. The adhesive 40 is applied to the AnMEGA 10 by a coating method such as roll screen printing.

Components, other than the AnMEGA 10, the resin sheet 20, the CaGDL 30, and the adhesive 40, such as a separator and a gasket are also provided to the fuel battery cell 1, and the fuel battery cells 1 each composed of these components are stacked together so that a fuel cell (not shown) is manufactured.

Configuration and Operation of Fuel Battery Cell Manufacturing Apparatus

Next, the configuration of a manufacturing apparatus 100 for manufacturing the fuel battery cells 1 will be described.

Figure 2:
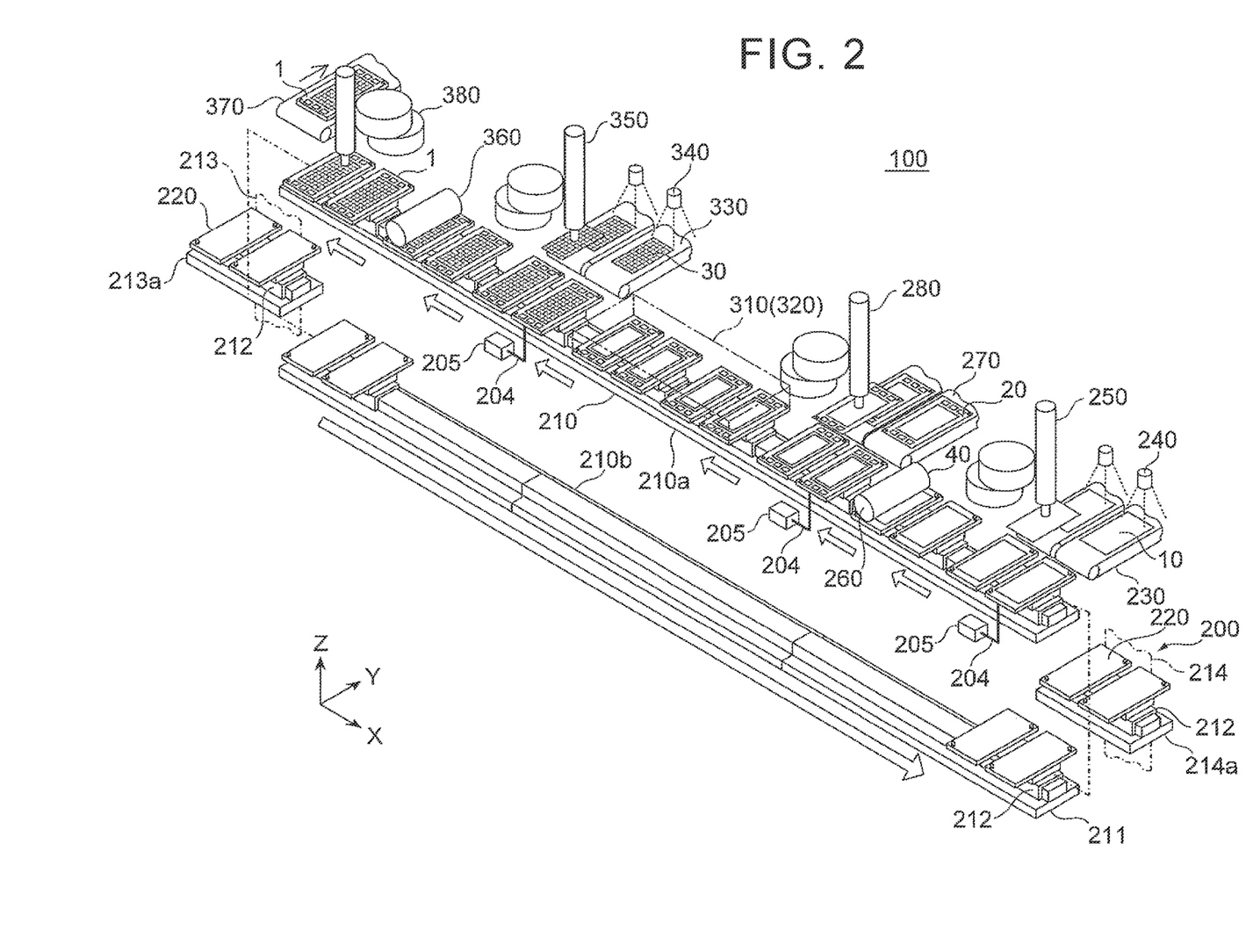
FIG. 2 is a perspective view schematically showing a fuel battery cell manufacturing apparatus according to the embodiment of the disclosure.

In the following description, the X-direction of the manufacturing apparatus 100 represents an extending direction of a rail 211 disposed substantially horizontally (i.e. a moving direction or a transfer direction of an electrostatic chuck 220 fixed to a slider 212), the Y-direction represents a direction perpendicular to the extending direction of the rail 211 in the horizontal plane, and the Z-direction represents a vertical direction (direction perpendicular to the X-direction and the Y-direction).

As shown in FIG. 2, the manufacturing apparatus 100 includes the transfer apparatus 200 including a linear conveyor 210, the electrostatic chucks 220 as palettes, power sources 205, and earths 215.

The manufacturing apparatus 100 further includes a MEGA supply apparatus 230 that supplies the AnMEGA 10 to a position on the side of the linear conveyor 210, cameras 240 that each detect the posture of the AnMEGA 10 on the MEGA supply apparatus 230, a selective compliance assembly robot (SCARA robot) 250 that picks up the AnMEGA 10 from the MEGA supply apparatus 230 and puts it on the electrostatic chuck 220, a coating apparatus 260 that applies the adhesive 40 to a surface of the AnMEGA 10 placed on the electrostatic chuck 220, a resin sheet supply apparatus 270 that supplies the resin sheet 20 to a position on the side of the linear conveyor 210, a SCARA robot 280 that picks up the resin sheet 20 from the resin sheet supply apparatus 270 and puts it on the electrostatic chuck 220, a UV irradiation apparatus 310 that UV-cures part of the adhesive 40 applied to the surface of the AnMEGA 10, a GDL supply apparatus 330 that supplies the CaGDL 30 to a position on the side of the linear conveyor 210, cameras 340 that each detect the posture of the CaGDL 30 on the GDL supply apparatus 330, and a SCARA robot 350 that picks up the CaGDL 30 from the GDL supply apparatus 330 and puts it on the electrostatic chuck 220.

The SCARA robots 250, 280, 350 as placement apparatuses for placing the AnMEGA 10, the resin sheet 20, and the CaGDL 30 as transfer members on the electrostatic chuck 220 form the transfer apparatus 200 jointly with the linear conveyor 210 and so on.

The manufacturing apparatus 100 further includes a heating apparatus 360 that thermally cures an uncured portion, that is not UV-cured, of the adhesive 40 applied to the surface of the AnMEGA 10, a transfer apparatus 370 that transfers the completed fuel battery cell 1 after the adhesive 40 is cured, and a SCARA robot 380 that picks up the completed fuel battery cell 1 from the linear conveyor 210 and places it on the transfer apparatus 370.

The manufacturing apparatus 100 includes a control device (not shown), and the operating states of the components forming the manufacturing apparatus 100 are controlled by the control device.

Since the components of the manufacturing apparatus 100 other than the electrostatic chucks 220, the power sources 205, and the earths 215 of the transfer apparatus 200 are almost the same as those conventionally known, those components will be briefly described first.

The linear conveyor 210 of the transfer apparatus 200 is for moving the electrostatic chucks 220 serving as palettes on which the components (transfer members) of the fuel battery cells 1 are placed, and includes the rail 211 fixedly disposed at a predetermined place, and the sliders 212 that move on the rail 211. The sliders 212 are driven by a linear motor (not shown) to move on the rail 211.

In this example, the linear conveyor 210 includes an upper linear conveyor 210a that is fixedly disposed on the upper side in the vertical direction (Z-direction) and has a length corresponding to the manufacturing process of the fuel battery cell 1 and that transfers the slider 212 toward one side in the horizontal direction (X-direction), and a lower linear conveyor 210b that is fixedly disposed on the lower side of the upper linear conveyor 210a and transfers the slider 212 toward the opposite side in the horizontal direction (X-direction).

The linear conveyor 210 further includes a pair of lifting circulation mechanisms 213, 214 that respectively lower and raise the slider 212 in the vertical direction (Z-direction) for circulation. The lifting circulation mechanism 213 is fixedly disposed between a downstream end portion of the upper linear conveyor 210a in the transfer direction and an upstream end portion of the lower linear conveyor 210b. The lifting circulation mechanism 213 receives the slider 212 on a rail 213a from the upper linear conveyor 210a, holds and lowers the rail 213a, and delivers the slider 212 to the lower linear conveyor 210b. The lifting circulation mechanism 214 is fixedly disposed between an upstream end portion of the upper linear conveyor 210a in the transfer direction and a downstream end portion of the lower linear conveyor 210b. The lifting circulation mechanism 214 receives the slider 212 on a rail 214a from the lower linear conveyor 210b, holds and raises the rail 214a, and delivers the slider 212 to the upper linear conveyor 210a.

By the lifting circulation mechanisms 213, 214, the upper linear conveyor 210a, and the lower linear conveyor 210b, (the rail 211 of) the linear conveyor 210 is formed in an endless annular shape so that the electrostatic chucks 220 fixedly placed on the slider 212 circulate (circle) on (the rail 211 of) the linear conveyor 210.

The MEGA supply apparatus 230 shown in FIG. 2 includes a transfer mechanism such as a belt conveyor and supplies the AnMEGA 10 to the predetermined position at the upstream end of (the upper linear conveyor 210a of) the linear conveyor 210 in the transfer direction in a posture state where the AnGDL of the AnMEGA 10 faces downward and the cathode-side electrode catalyst layer of the MEA faces upward. The camera 240 is formed by an image pickup device such as a charge-coupled device (CCD) image sensor or a complementary metal-oxide-semiconductor (CMOS) image sensor. The camera 240 captures an image of the posture of the AnMEGA 10 that is supplied from the MEGA supply apparatus 230, and transmits captured image data to the SCARA robot 250 via the control device. The SCARA robot 250 is formed by a horizontal articulated robot with an arm that operates in the horizontal direction. The SCARA robot 250 operates the arm according to the posture that is obtained based on the image of the AnMEGA 10 captured by the camera 240 and transmitted via the control device, so as to pick up the AnMEGA 10 from the MEGA supply apparatus 230 and put it at a predetermined position on the electrostatic chuck 220 being transferred. The SCARA robot 250 is controlled in synchronism with the movement of the electrostatic chuck 220 so that the SCARA robot 250 can accurately put the AnMEGA 10 at the preset position on the electrostatic chuck 220 being transferred, without stopping the movement of the electrostatic chuck 220.

As the placement apparatus for placing the component (workpiece) of the fuel battery cell 1 on the electrostatic chuck 220, an articulated robot, a Cartesian robot, or the like may be employed instead of the SCARA robot 250 that is capable of high-speed placement as described above.

The coating apparatus 260 applies the adhesive 40, by the coating method such as roll screen printing, to a preset coating region (see FIG. 1B) on the surface of the AnMEGA 10 placed on the electrostatic chuck 220 and being transferred.

The resin sheet supply apparatus 270 is configured in the same manner as the MEGA supply apparatus 230 and supplies the resin sheet 20 to the position on the side of (the upper linear conveyor 210a of) the linear conveyor 210. The SCARA robot 280 is configured in the same manner as the SCARA robot 250. The SCARA robot 280 picks up the resin sheet 20 from the resin sheet supply apparatus 270 and places it at a preset position on the electrostatic chuck 220 being transferred. By the placement of the resin sheet 20 by the SCARA robot 280, the resin sheet 20 and the AnMEGA 10 are bonded to each other in a state where the adhesive 40 is interposed therebetween.

The UV irradiation apparatus 310 is formed by LEDs that irradiate ultraviolet rays to predetermined spot areas, and includes a case 320 covering upper portions of the electrostatic chucks 220 for preventing leakage of irradiating ultraviolet rays to the outside. The UV irradiation apparatus 310 presses the resin sheet 20 against the AnMEGA 10 on the electrostatic chuck 220 and irradiates ultraviolet rays only to the outer region, overlapping the resin sheet 20, of the adhesive 40 to UV-cure the adhesive 40 of its outer region, thereby bonding the resin sheet 20 and the AnMEGA 10 together.

The GDL supply apparatus 330 is configured in the same manner as the MEGA supply apparatus 230 and the resin sheet supply apparatus 270 and supplies the CaGDL 30 to the position on the side of (the upper linear conveyor 210a of) the linear conveyor 210. The camera 340 is configured in the same manner as the camera 240 and captures an image of the posture of the CaGDL 30 that is supplied from the GDL supply apparatus 330, and transmits captured image data to the SCARA robot 350 via the control device. The SCARA robot 350 is configured in the same manner as the SCARA robot 250 and the SCARA robot 280. The SCARA robot 350 operates its arm according to the posture that is obtained based on the image of the CaGDL 30 in the GDL supply apparatus 330 captured by the camera 340 and transmitted via the control device, so as to pick up the CaGDL 30 from the GDL supply apparatus 330 and put it on the electrostatic chuck 220 being transferred so as to fit it into the through-hole 21 of the resin sheet 20 being transferred. The CaGDL 30 fitted into the through-hole 21 of the resin sheet 20 is put on the surface of the AnMEGA 10 on the cathode-side electrode catalyst layer side and bonded thereto by a portion of the adhesive 40 applied to the AnMEGA 10, the portion being the adhesive 40 of its inner region protruding into the through-hole 21.

The heating apparatus 360 is disposed on the downstream side of the SCARA robot 350 in the transfer direction of the electrostatic chuck 220. The heating apparatus 360 presses the CaGDL 30, being transferred by the electrostatic chuck 220, against the AnMEGA 10 and applies heating to thermally cure the adhesive 40 of its inner region overlapping the CaGDL 30. By this thermal curing, the CaGDL 30 is bonded to the AnMEGA 10 and thus the CaGDL 30, the resin sheet 20, and the AnMEGA 10 are integrated together so that the fuel battery cell 1 being a framed MEGA is completed.

The transfer apparatus 370 is configured in the same manner as the GDL supply apparatus 330, the resin sheet supply apparatus 270, and the MEGA supply apparatus 230 and transfers the completed fuel battery cell 1 to a predetermined place. The SCARA robot 380 is configured in the same manner as the SCARA robot 350, the SCARA robot 280, and the SCARA robot 250. The SCARA robot 380 picks up the completed fuel battery cell 1 from the electrostatic chuck 220 being transferred and places it on the transfer apparatus 370.

Herein, when finally attracting/releasing the completed fuel battery cell 1, a voltage with plus and minus reversed may be applied to (a positive electrode 222 and a negative electrode 223 of) an electrode 221 (described in detail later) of the electrostatic chuck 220 using a power source (not shown).

When the electrostatic chucks 220 as the palettes become empty on the upper linear conveyor 210a, the slider 212 to which the empty electrostatic chucks 220 are fixed is placed on the rail 213a of the lifting circulation mechanism 213 and lowered in the vertical direction (Z-direction) to be placed on the rail 211 of the lower linear conveyor 210b. Then, the slider 212 is transferred to the downstream end portion of the lower linear conveyor 210b at high speed, placed on the rail 214a of the lifting circulation mechanism 214, and raised in the vertical direction (Z-direction) to be placed on the rail 211 of the upper linear conveyor 210a. Then, the slider 212 is transferred in the transfer direction (X-direction) by the upper linear conveyor 210a again like at the start of transfer.

Configuration and Operation of Transfer Apparatus 200

Next, of the components of the manufacturing apparatus 100, the electrostatic chucks 220, the power sources 205, and the earths 215 of the transfer apparatus 200 being the features of this embodiment will be described with reference to FIGS. 3 to 8 in addition to FIG. 2.

The transfer apparatus 200 forming the manufacturing apparatus 100 places and transfers the above-described components of the fuel battery cells 1 having electrical conductivity and insulation while attracting them, and, as described above, includes the electrostatic chucks 220, the power sources 205 each provided with a power supply electrode 203 having a power supply surface 202, and the earths 215.

Figure 3:
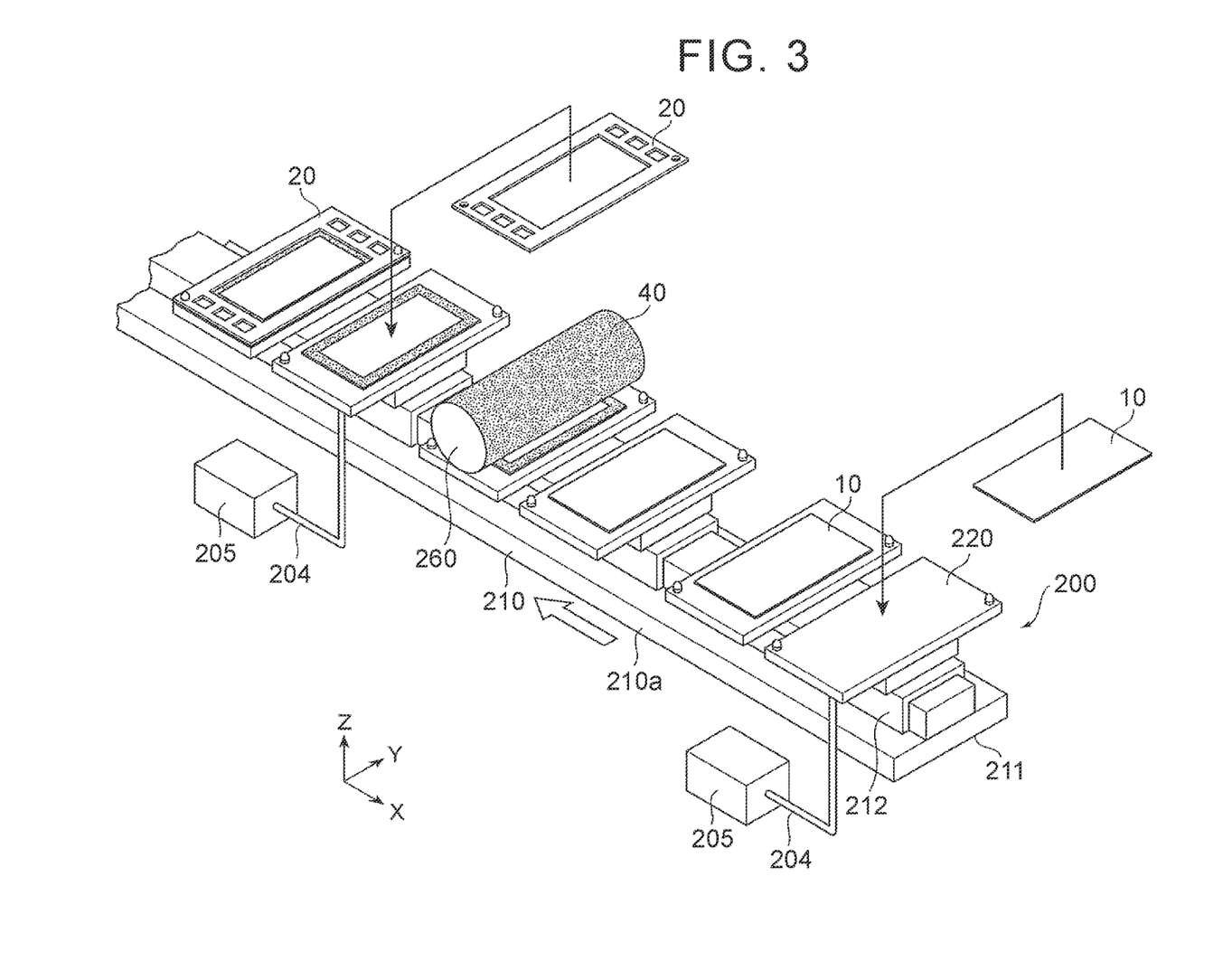
FIG. 3 is an enlarged perspective view showing a main part of FIG. 2 on an enlarged scale.

As shown on an enlarged scale in FIG. 3, the electrostatic chuck 220 is formed in a rectangular shape greater than the slider 212 and is placed on and fixed (e.g. fastened by bolts) to an upper surface of the slider 212 such that both end portions of the electrostatic chuck 220 in its longitudinal direction protrude from the slider 212 (in the Y-direction).

Figure 4:
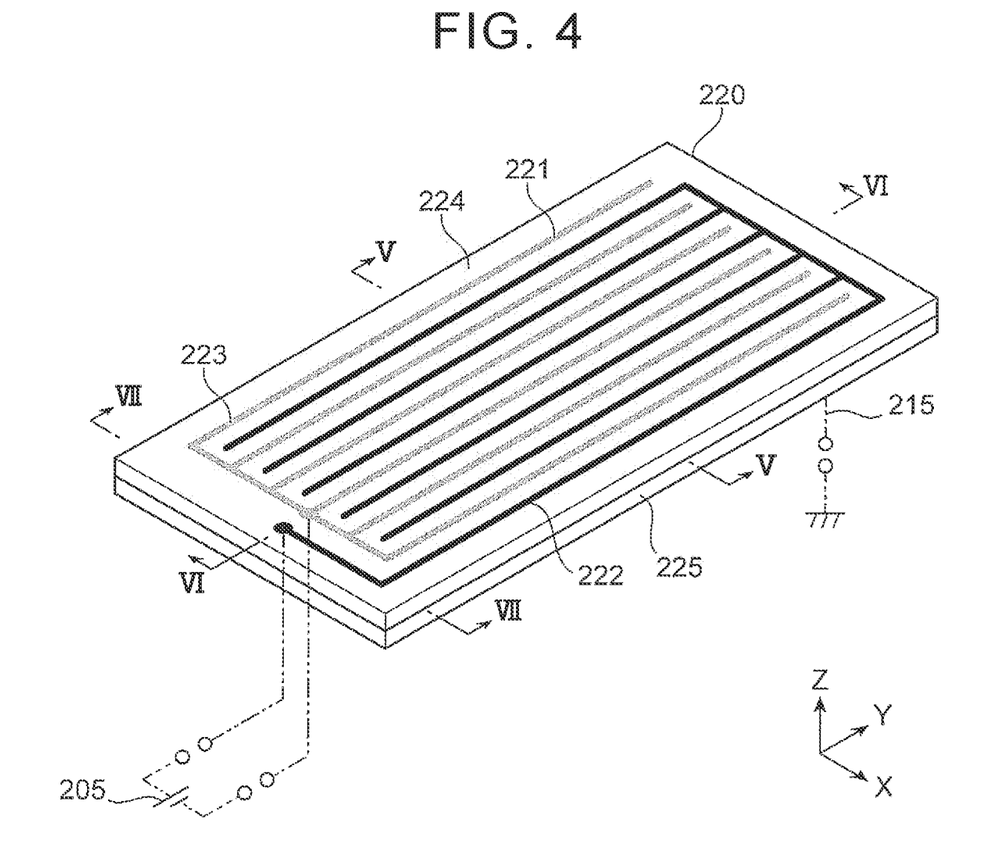
FIG. 4 is a perspective view showing an electrostatic chuck of a transfer apparatus shown in FIGS. 2 and 3.
Figure 5:
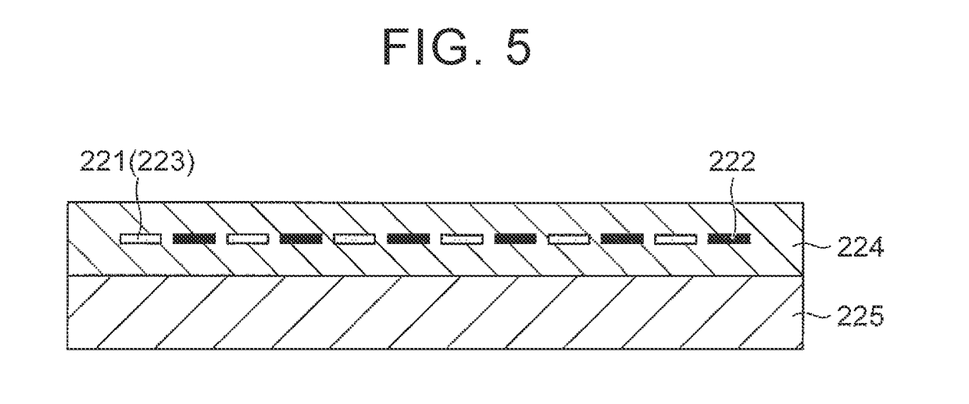
FIG. 5 is a sectional view taken along the line V-V of FIG. 4.

As is clearly seen from FIGS. 4 and 5, the electrostatic chuck 220 is formed with the electrode (hereinafter may also be referred to as an "electrostatic electrode" or a "finely patterned electrode") 221 on the upper surface (placement surface for placing a workpiece thereon) side and is provided with an aluminum plate 225 as a support plate on the lower surface (back surface on the side opposite to the placement surface) side. The electrode 221 includes the positive electrode 222 and the negative electrode 223 and is formed by molding a highly dielectric insulating material 224 including the positive electrode 222 and the negative electrode 223 into a plate shape. The molded electrode 221 is bonded to the aluminum plate 225. In order to generate strong gradient force (electrostatic force), the electrode 221 is configured such that, for example, the gap between the positive electrode 222 and the negative electrode 223 is set to a marginal gap that can withstand a voltage to be applied. In the example shown, the positive electrode 222 and the negative electrode 223 are a pair of combs facing each other, but the wiring pattern of the positive electrode 222 and the negative electrode 223 is not limited thereto.

Figure 6:
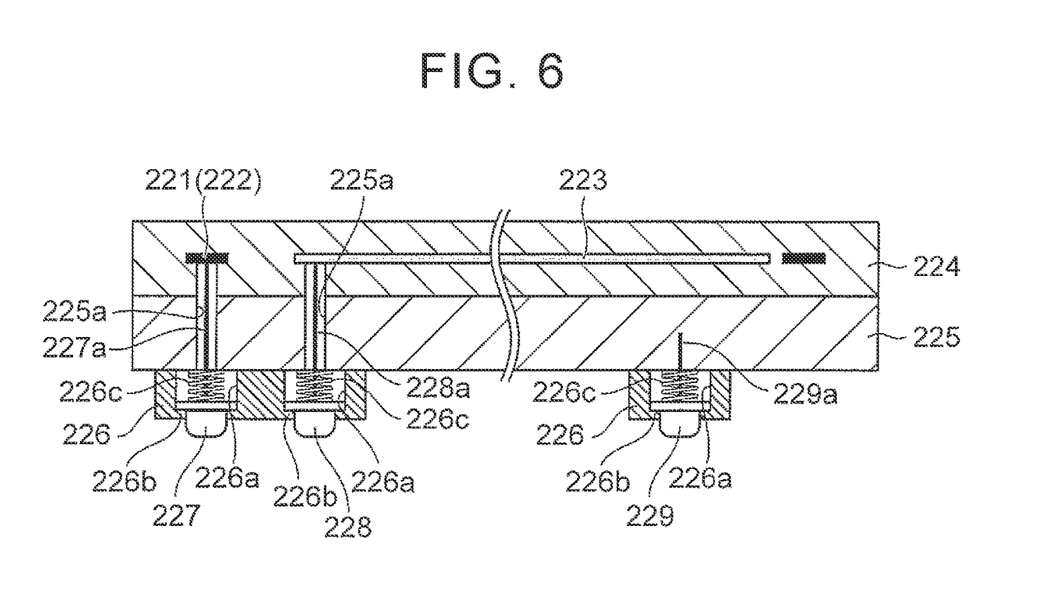
FIG. 6 is a sectional view taken along the line VI-VI of FIG. 4.
Figure 7:
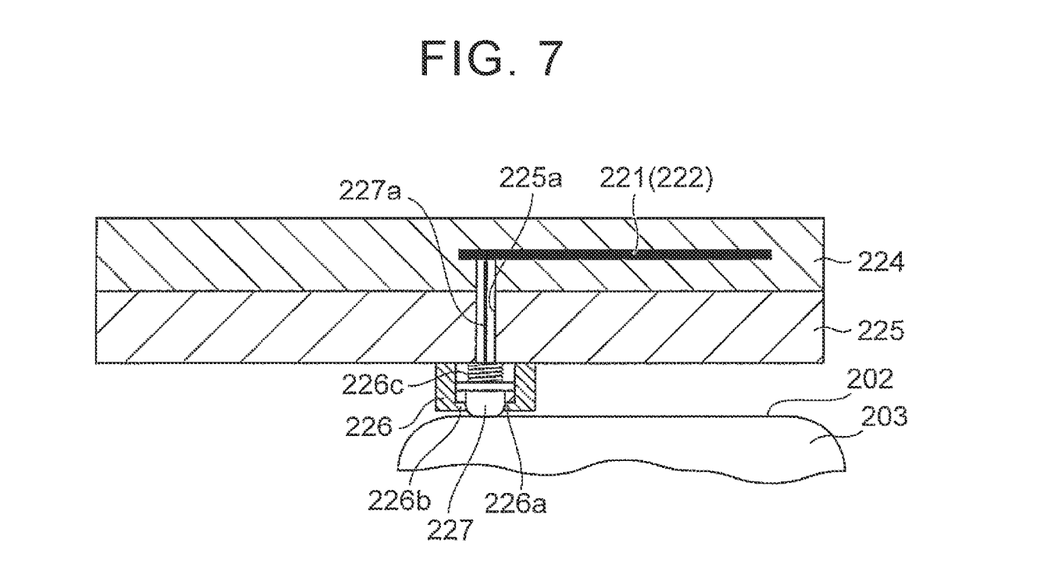
FIG. 7 is a sectional view taken along the line VII-VII of FIG. 4.

As is clearly seen from FIG. 6, a power receiving positive electrode 227 and a power receiving negative electrode 228 for supplying power to (the positive electrode 222 and the negative electrode 223 of) the electrode 221 are provided near one end, in the longitudinal direction (Y-direction), of a lower surface (back surface) of the aluminum plate 225, and a ground electrode 229 for grounding the electrostatic chuck 220 is provided near the opposite end, in the longitudinal direction (Y-direction), of the lower surface of the aluminum plate 225. That is, on the lower surface of the aluminum plate 225, the power receiving positive and negative electrodes 227, 228 and the ground electrode 229 are disposed at positions (on the opposite sides) sandwiching (the centers of the rail 211 and the slider 212 of) the linear conveyor 210.

Specifically, the aluminum plate 225 is covered with insulating aluminum oxide over its entire surface for the purpose of corrosion protection, and electrode mounting members 226 provided with accommodation holes 226a large enough to respectively accommodate the power receiving positive electrode 227, the power receiving negative electrode 228, and the ground electrode 229 are attached to an aluminum-oxide lower surface of the aluminum plate 225. An inner-flange locking portion 226b is provided to protrude (inward) at a lower end portion of the accommodation hole 226a. The power receiving positive electrode 227, the power receiving negative electrode 228, and the ground electrode 229 are each disposed in the accommodation hole 226a with its lower end portion (portion that serves as a contact) protruding from the accommodation hole 226a and are each vertically movable in the accommodation hole 226a and prevented from coming out of the accommodation hole 226a by the inner-flange locking portion 226b. In each accommodation hole 226a, a compression coil spring 226c is compressed between the power receiving positive electrode 227, the power receiving negative electrode 228, or the ground electrode 229 and the lower surface of the aluminum plate 225. The compression coil spring 226c urges the power receiving positive electrode 227, the power receiving negative electrode 228, or the ground electrode 229 downward (toward the power supply surface 202 of the power supply electrode 203 or the earth 215 which will be described later) and (elastically) releases force that occurs when the power receiving positive electrode 227, the power receiving negative electrode 228, or the ground electrode 229 comes into contact with the power supply surface 202 of the power supply electrode 203 or the earth 215. That is, in this example, the power receiving positive electrode 227, the power receiving negative electrode 228, and the ground electrode 229 provided to the lower surface of the aluminum plate 225 each have a plunger structure incorporating the compression coil spring 226c.

The power receiving positive electrode 227 and the power receiving negative electrode 228 accommodated in the accommodation holes 226a of the electrode mounting member 226 are (electrically) connected respectively to the positive electrode 222 and the negative electrode 223 via electrical wires 227a, 228a inserted through through-holes 225a passing through the aluminum plate 225. The ground electrode 229 is (electrically) connected to the aluminum plate 225 via an electrical wire 229a. In other words, in order to maintain attraction without power supply (described in detail later), the aluminum plate 225 is electrically connected to the ground electrode 229 (via the electrical wire 229a).

The electrostatic chuck 220 is configured to attract a workpiece (component of the fuel battery cell 1), put on the electrostatic chuck 220, by static electricity that is generated in the electrode 221 by applying a voltage to the positive electrode 222 and the negative electrode 223 via the power receiving positive electrode 227 and the power receiving negative electrode 228. The electrostatic chuck 220 can attract both a conductive material and an insulating material according to the structure of the electrode 221 and the dielectric property of the insulating material 224.

That is, in this embodiment, the electrostatic chuck 220 does not carry a power source such as a rechargeable battery, wires that connect a power source and the electrode 221, or the like for performing high-speed transfer.

The power source 205 is a direct-current power source for applying a voltage to the electrode 221 (the positive electrode 222 and the negative electrode 223) via the power receiving positive electrode 227 and the power receiving negative electrode 228. The power sources 205 are provided separately from the linear conveyor 210 and the electrostatic chucks 220 and disposed at predetermined portions (in the example shown, near the MEGA supply apparatus 230 and the SCARA robot 250, near the resin sheet supply apparatus 270 and the SCARA robot 280, and near the GDL supply apparatus 330 and the SCARA robot 350) on the side of the upper linear conveyor 210a of the linear conveyor 210. Each power source 205 is provided with the power supply electrode 203 that is disposed to be located below (the aluminum plate 225 of) the electrostatic chuck 220 fixedly placed on the slider 212. Each power supply electrode 203 is fixedly disposed at a position where when the electrostatic chuck 220 disposed on the slider 212 moves on the linear conveyor 210 by the movement of the slider 212, the upper surface (the power supply surface 202) of the power supply electrode 203 comes into contact with the power receiving positive electrode 227 and the power receiving negative electrode 228 provided to the lower surface of (the aluminum plate 225 of) the electrostatic chuck 220 (see FIG. 7). The power source 205 and the power supply electrode 203 are (electrically) connected to each other via wires 204.

Figure 8A:
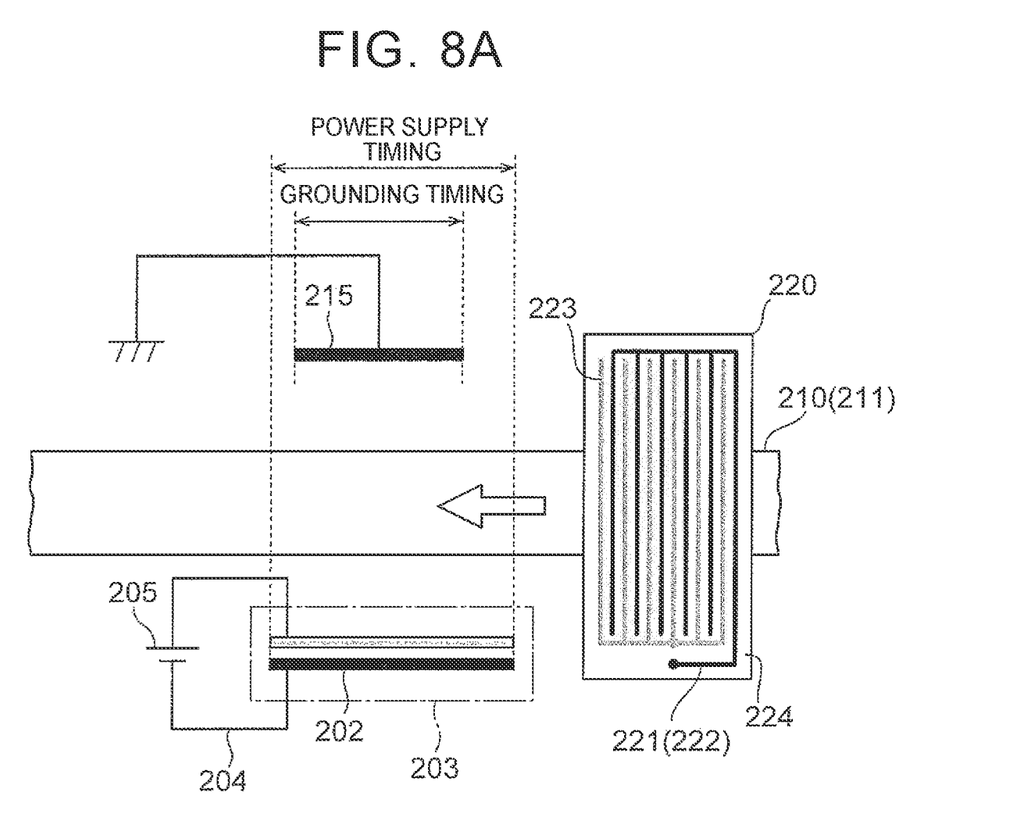
FIG. 8A is a top view showing one example of the electrode arrangement of the transfer apparatus according to the embodiment of the disclosure.

As shown in FIG. 8A, the power supply electrode 203 is formed in a rail shape having a predetermined length in the transfer direction (X-direction), and the upper surface (the power supply surface 202) of the power supply electrode 203 is a flat surface having a predetermined length in the transfer direction (X-direction). When the electrostatic chuck 220 moves on the linear conveyor 210 by the movement of the slider 212, the power receiving positive electrode 227 and the power receiving negative electrode 228 provided to the lower surface of (the aluminum plate 225 of) the electrostatic chuck 220 and the power supply surface 202 of the power supply electrode 203 come in contact with each other along the predetermined length in the transfer direction (X-direction) (i.e. for a predetermined time width) by the relative movement of the electrostatic chuck 220 and (the power supply surface 202 of) the power supply electrode 203 in the transfer direction (X-direction), and the power source 205 applies a voltage to the positive electrode 222 and the negative electrode 223 via the power receiving positive electrode 227, the power receiving negative electrode 228, and the electrical wires 227a, 228a while the power receiving positive electrode 227 and the power receiving negative electrode 228 are in contact with the power supply surface 202 of the power supply electrode 203.

The earth 215 is for grounding (the aluminum plate 225 of) the electrostatic chuck 220. Like the power sources 205, the earths 215 are provided separately from the linear conveyor 210 and the electrostatic chucks 220 and disposed at predetermined portions (in the example shown, near the MEGA supply apparatus 230 and the SCARA robot 250, near the resin sheet supply apparatus 270 and the SCARA robot 280, and near the GDL supply apparatus 330 and the SCARA robot 350) on the side of the upper linear conveyor 210a of the linear conveyor 210. Each earth 215 is disposed to be located below (the aluminum plate 225 of) the electrostatic chuck 220 fixedly placed on the slider 212. Each earth 215 is fixedly disposed at a position where when the electrostatic chuck 220 disposed on the slider 212 moves on the linear conveyor 210 by the movement of the slider 212, the earth 215 comes into contact with the ground electrode 229 provided to the lower surface of (the aluminum plate 225 of) the electrostatic chuck 220.

That is, in this embodiment, each earth 215 and a corresponding one of the power supply electrodes 203 are disposed at positions (on the opposite sides) sandwiching (the center of the rail 211 of) the upper linear conveyor 210a. With this configuration, it is possible to prevent eccentric loading of the upper linear conveyor 210a of the linear conveyor 210, thereby dispersing the load.

As shown in FIG. 8A, the earth 215 is formed in a rail shape having a predetermined length in the transfer direction (X-direction). When the electrostatic chuck 220 moves on the linear conveyor 210 by the movement of the slider 212, the ground electrode 229 provided to the lower surface of (the aluminum plate 225 of) the electrostatic chuck 220 and the earth 215 come in contact with each other along the predetermined length in the transfer direction (X-direction) (i.e. for a predetermined time width) by the relative movement of the electrostatic chuck 220 and the earth 215 in the transfer direction (X-direction), and (the aluminum plate 225 of) the electrostatic chuck 220 is grounded via the ground electrode 229 and the electrical wire 229a while the ground electrode 229 is in contact with the earth 215.

Herein, in order to maintain attraction of the electrostatic chuck 220 without power supply, positions or timings of power supply by (the power supply electrode 203 of) the power source 205 and grounding by the earth 215 are as follows.

Figure 8B:
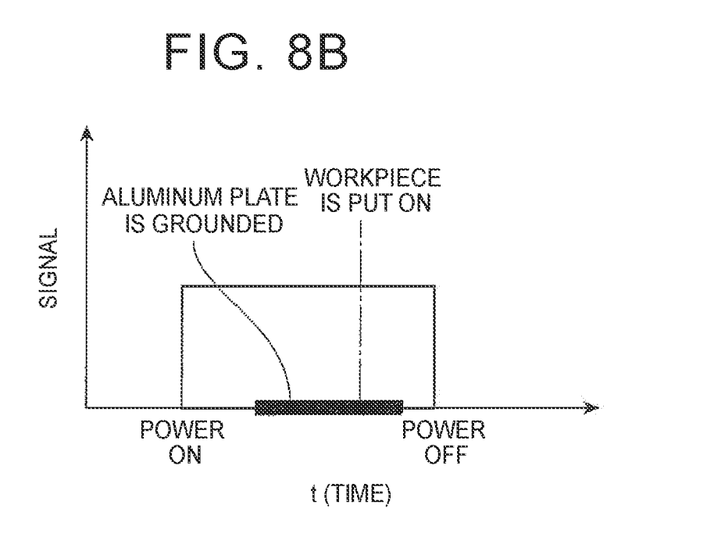
FIG. 8B is a timing chart of power supply (voltage application) and grounding according to the electrode arrangement shown in FIG. 8A.

As shown in FIGS. 8A and 8B, the upstream end of the power supply surface 202 of the power supply electrode 203 connected to the power source 205 is set upstream of the upstream end of the earth 215 (as viewed in the transfer direction (X-direction)), and the downstream end of the power supply surface 202 of the power supply electrode 203 is set downstream of the downstream end of the earth 215 (as viewed in the transfer direction (X-direction)). Consequently, when the electrostatic chuck 220 moves on the linear conveyor 210 by the movement of the slider 212, position or timing at which the power receiving positive and negative electrodes 227, 228 and the power supply surface 202 of the power supply electrode 203 come into contact with each other (i.e. power supply start position) is upstream of position or timing at which the ground electrode 229 and the earth 215 come into contact with each other (i.e. grounding start position), and position or timing at which the power receiving positive and negative electrodes 227, 228 and the power supply surface 202 of the power supply electrode 203 separate from each other (come out of contact with each other) (i.e. power supply end position) is downstream of position or timing at which the ground electrode 229 and the earth 215 separate from each other (come out of contact with each other) (i.e. grounding end position). In other words, the grounding start position by the earth 215 is provided downstream of the power supply start position by the power supply surface 202 of the power supply electrode 203, and the grounding end position by the earth 215 is provided upstream of the power supply end position by the power supply surface 202 of the power supply electrode 203.

Herein, a putting position where a workpiece (component of the fuel battery cell 1) is put on the electrostatic chuck 220 by each of the SCARA robots 250, 280, 350 is set between the power supply start position and the power supply end position by the power supply surface 202 of the power supply electrode 203 and between the grounding start position and the grounding end position by the earth 215.

By setting the arrangement relationship of the components of the manufacturing apparatus 100 in this way, when the electrostatic chuck 220 is transferred to a predetermined position (position upstream of the putting position by each of the SCARA robots 250, 280, 350) by (the upper linear conveyor 210a of) the linear conveyor 210, power is supplied, i.e. voltage is applied, to (the electrode 221 of) the electrostatic chuck 220, and thereafter, (the aluminum plate 225 of) the electrostatic chuck 220 is grounded via the earth 215, as described above. That is, after breaking the balance of static electricity accumulated in the insulating resin sheet 20 by grounding the aluminum plate 225 at the back of the electrostatic chuck 220 (via the ground electrode 229) in a power-supplied state, power supply is stopped (the power source 205 is separated) to maintain attraction force (electrostatic attraction force) so that a workpiece (component of the fuel battery cell 1) can be attracted and placed on (the placement surface of) the electrostatic chuck 220.

Therefore, in this embodiment, for example, a workpiece (component of the fuel battery cell 1) put on the electrostatic chuck 220 being transferred can be attracted and placed on (the placement surface of) the electrostatic chuck 220 without power supply (without power supply or voltage application) in (the upper linear conveyor 210a of) the linear conveyor 210 between the MEGA supply apparatus 230/the SCARA robot 250 and the resin sheet supply apparatus 270/the SCARA robot 280, between the resin sheet supply apparatus 270/the SCARA robot 280 and the GDL supply apparatus 330/the SCARA robot 350, and between the GDL supply apparatus 330/the SCARA robot 350 and the transfer apparatus 370/the SCARA robot 380.

In this embodiment, in order to reliably attract the components forming the fuel battery cell 1 on (the placement surface of) the electrostatic chuck 220, power supply and grounding are performed at the positions or timings shown in FIGS. 8A and 8B every time the components (the AnMEGA 10, the resin sheet 20, the CaGDL 30) forming the fuel battery cell 1 are stacked, but power supply and grounding are not necessarily performed in all stacking processes.

Operation and Effect of Fuel Battery Cell Manufacturing Apparatus (Transfer Apparatus)

As described above, in this embodiment, after the electrostatic chuck 220 for attracting and placing a workpiece (component of the fuel battery cell 1) as a transfer member on the placement surface by electrostatic attraction receives electric power from the power supply surface 202 of the power supply electrode 203 via the power receiving positive electrode 227 and the power receiving negative electrode 228, the electrostatic chuck 220 is grounded by the earth 215 via the ground electrode 229 so that the electrostatic chuck 220 attracts and places the workpiece (component of the fuel battery cell 1) on the placement surface by electrostatic attraction in the state where the electrostatic balance is broken. Therefore, it is possible to expand the movable range during transfer without increasing the transfer weight.

Since it is sufficient to perform power supply from the outside via the power receiving positive electrode 227 and the power receiving negative electrode 228 only at the time of chucking, the electrostatic chuck 220 does not require routing of wires so that there is also an advantage that the configuration of the electrostatic chuck 220 can be simplified.

Other Examples of Fuel Battery Cell Manufacturing Apparatus (Transfer Apparatus)

In the meantime, when the electrostatic chuck 220 is charged with the same polarity in every electrification, the electric charge remains so that attraction force of the electrostatic chuck 220 decreases.

In view of this, as shown in FIGS. 9A and 9B and FIGS. 10A and 10B, it is possible to prevent this attraction force decrease by once applying a reverse voltage to the electrostatic chuck 220 before attraction power supply.

Figure 9A:
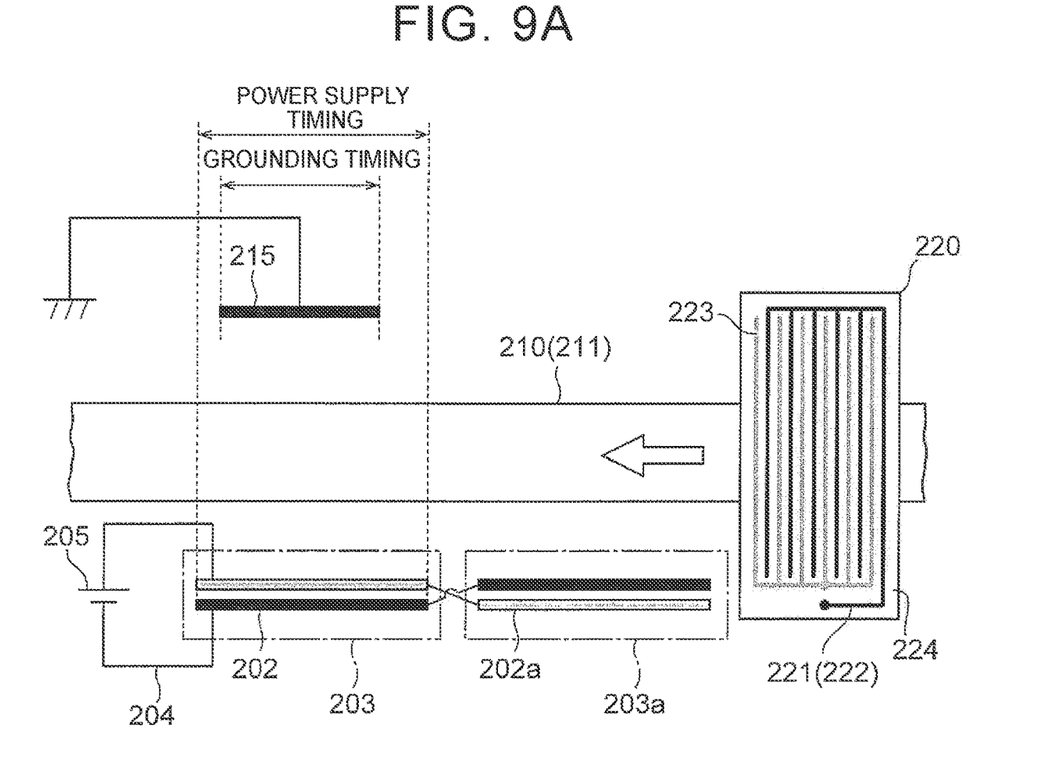
FIG. 9A is a top view showing another example of the electrode arrangement of the transfer apparatus according to the embodiment of the disclosure.
Figure 9B:
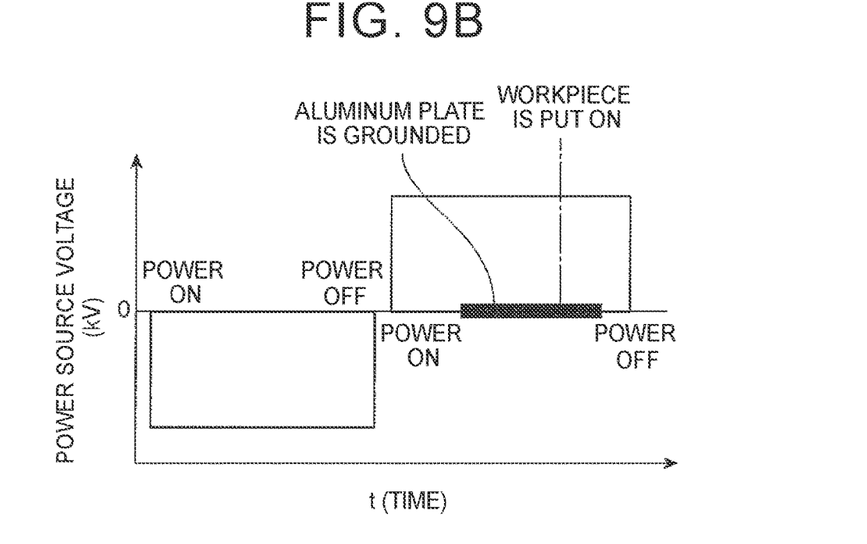
FIG. 9B is a timing chart of voltage application and grounding according to the electrode arrangement shown in FIG. 9A.

In the example shown in FIGS. 9A and 9B, a polarity-reversing power supply electrode 203a formed in a rail shape (having a predetermined length in the transfer direction (X-direction)) and having a polarity-reversing power supply surface 202a for reversing the polarity of voltage applied to the electrostatic chuck 220 is provided on the upstream side of the power supply surface 202 of the power supply electrode 203, and (the power supply surface 202 of) the power supply electrode 203 and (the polarity-reversing power supply surface 202a of) the polarity-reversing power supply electrode 203a are both connected to the power source 205 to use voltage of the power source 205.

The position, the length (time width), and so on of (the polarity-reversing power supply surface 202a of) the polarity-reversing power supply electrode 203a can, of course, be set as appropriate.

Figure 10A:
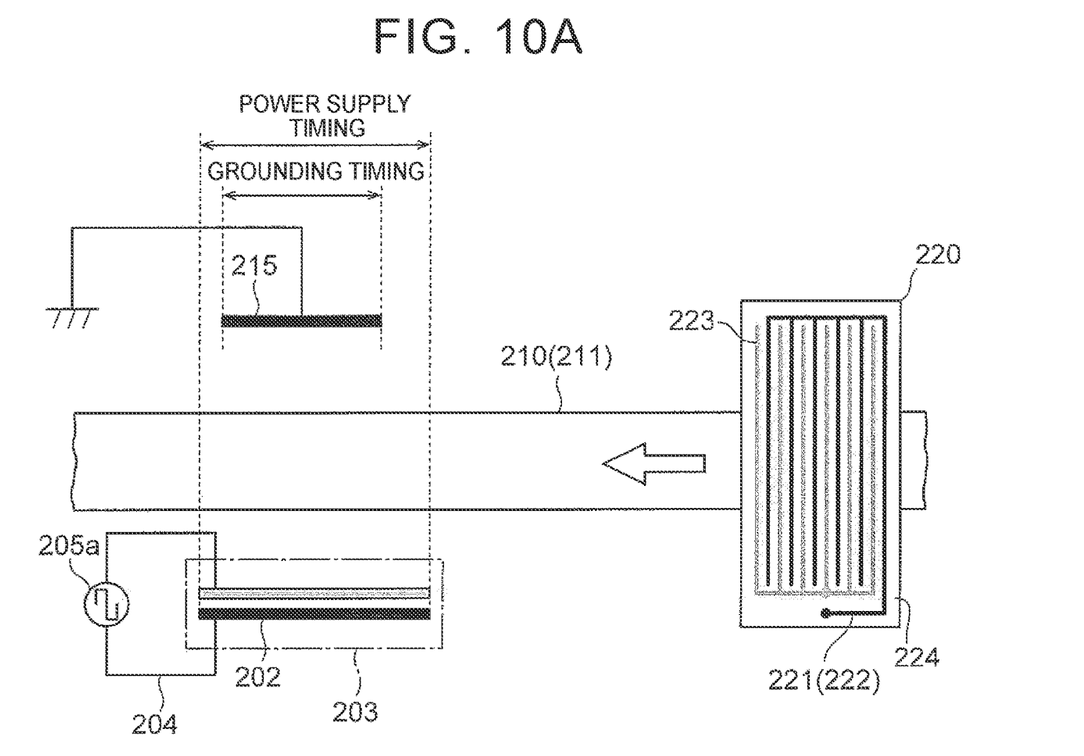
FIG. 10A is a top view showing still another example of the electrode arrangement of the transfer apparatus according to the embodiment of the disclosure.
Figure 10B:
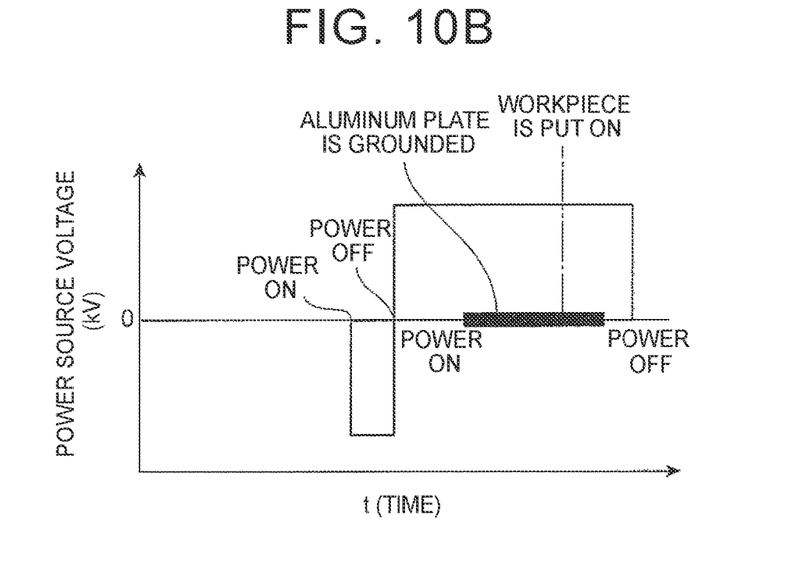
FIG. 10B is a timing chart of voltage application and grounding according to the electrode arrangement shown in FIG. 10A.

In the example shown in FIGS. 10A and 10B, a power source 205a is formed by a polarity-reversible pulse power source, and, by properly setting the transfer speed of the electrostatic chuck 220 and the pulse width of the power source 205a (pulse power source), a reversing voltage is applied to the power supply surface 202 of the power supply electrode 203 before applying an attraction voltage to the power supply surface 202 of the power supply electrode 203 (in other words, a polarity-reversing power supply surface for reversing the polarity of voltage applied to the electrostatic chuck 220 is formed in advance on the power supply surface 202 of the power supply electrode 203 by the pulse power source).

In the example shown, by switching the power source 205a (pulse power source), the reversing voltage is applied to the power supply surface 202 of the power supply electrode 203 just before applying the attraction voltage to the power supply surface 202 of the power supply electrode 203. Herein, the position or timing of applying the reversing voltage to the power supply surface 202 of the power supply electrode 203 (in other words, forming the polarity-reversing power supply surface on the power supply surface 202 of the power supply electrode 203), the length (time width), the magnitude of the voltage, and so on can, of course, be set as appropriate.

In this way, by providing the polarity-reversing power supply surface for reversing the polarity of voltage applied to the electrostatic chuck 220 moving on (the upper linear conveyor 210a of) the linear conveyor 210, it is possible to prevent a decrease in attraction force that would be otherwise caused by continuing application of the same polarity voltage.

While the embodiment of the disclosure has been described in detail with reference to the drawings, specific configurations are not limited thereto, and even when design changes and so on are made within a range not departing from the gist of the disclosure, those are included in the disclosure

What is claimed is:

1. A transfer apparatus using an electrostatic attraction comprising:
    an electrostatic chuck including an electrostatic electrode disposed at a placement surface and including a power receiving electrode and a ground electrode disposed at a surface different from the placement surface, the electrostatic chuck configured to attract and place a transfer member on the placement surface by electrostatic attraction;
    a conveyor configured to move the electrostatic chuck;
    a power source having a power supply surface configured to apply a voltage to the electrostatic electrode by coming in contact with the power receiving electrode when the electrostatic chuck moves on the conveyor;
    an earth configured to ground the electrostatic chuck by coming in contact with the ground electrode when the electrostatic chuck moves on the conveyor; and
    a putting apparatus configured to put the transfer member on the placement surface, wherein:
    a power supply start position where the power supply surface starts to come in contact with the power receiving electrode is provided upstream of a putting position where the transfer member is put on the placement surface by the putting apparatus;
    a grounding start position where the earth starts to come in contact with the ground electrode is provided downstream of the power supply start position;
    a grounding end position where the earth ends to come in contact with the ground electrode is provided upstream of a power supply end position where the power supply surface ends to come in contact with the power receiving electrode; and
    the electrostatic chuck is grounded by the earth via the ground electrode after the electrostatic chuck receives electric power from the power supply surface via the power receiving electrode, the electrostatic chuck configured to attract and place the transfer member on the placement surface by the electrostatic attraction in a state where electrostatic balance is broken.

2. The transfer apparatus according to claim 1, wherein the putting position is provided between the grounding start position and the grounding end position.

3. The transfer apparatus according to claim 1, wherein:
    the electrostatic chuck includes an aluminum plate;
    the power receiving electrode passes through the aluminum plate and is electrically connected to the electrostatic electrode; and
    the ground electrode is electrically connected to the aluminum plate.

4. The transfer apparatus according to claim 1, wherein the power supply surface and the earth are disposed across the conveyor from each other.

5. The transfer apparatus according to claim 1, wherein:
    the conveyor is provided in an endless annular shape; and
    the electrostatic chuck is configured to circulate on the conveyor, and a polarity-reversing power supply surface for reversing polarity of voltage applied to the electrostatic chuck moving on the conveyor is provided.

6. The transfer apparatus according to claim 5, wherein:
    the polarity-reversing power supply surface is provided separately from the power supply surface; and
    the polarity-reversing power supply surface and the power supply surface are both configured to use voltage of the power source.

7. The transfer apparatus according to claim 5, wherein:
    the power source is formed by a pulse power source; and
    the polarity-reversing power supply surface is formed on the power supply surface by the pulse power source.

8. A transfer method using an electrostatic attraction comprising:
    causing an electrostatic chuck to receive electric power from a power supply surface by bringing a power receiving electrode into contact with the power supply surface when the electrostatic chuck moves on a conveyor configured to move the electrostatic chuck, the electrostatic chuck including an electrostatic electrode disposed at a placement surface and including the power receiving electrode and a ground electrode disposed at a surface different from the placement surface, the electrostatic chuck configured to place a transfer member on the placement surface by electrostatic attraction, the power supply surface included in a power source and configured to apply a voltage to the electrostatic electrode;
    grounding the electrostatic chuck by bringing the ground electrode into contact with an earth after the electrostatic chuck receives the electric power, the earth configured to ground the electrostatic chuck;
    putting the transfer member on the placement surface by a putting apparatus configured to put the transfer member on the placement surface, and attracting the transfer member on the placement surface by the electrostatic attraction in a state where electrostatic balance in the electrostatic chuck is broken; and
    transferring the transfer member attracted on the placement surface.

* * * * *